(12) United States Patent
Nemirovsky et al.

(10) Patent No.: US 9,759,601 B2
(45) Date of Patent: Sep. 12, 2017

(54) MUZZLE FLASH DETECTION

(71) Applicant: Technion Research and Development Foundation LTD., Haifa (IL)

(72) Inventors: Yael Nemirovsky, Haifa (IL); Tomer Merhav, Lotem (IL); Vitali Savuskan, Haifa (IL); Amikam Nemirovsky, Haifa (IL)

(73) Assignee: TECHNION RESEARCH AND DEVELOPMENT FOUNDATION, LTD., Haifa (IL)

( * ) Notice: Subject to any disclaimer, the term of this patent is extended or adjusted under 35 U.S.C. 154(b) by 119 days.

(21) Appl. No.: 14/249,388

(22) Filed: Apr. 10, 2014

(65) Prior Publication Data

US 2014/0312209 A1   Oct. 23, 2014

(30) Foreign Application Priority Data

Apr. 18, 2013 (IL) .......................................... 225839

(51) Int. Cl.
*G01J 1/42* (2006.01)
*G01J 1/04* (2006.01)

(52) U.S. Cl.
CPC ........... *G01J 1/4228* (2013.01); *G01J 1/0488* (2013.01)

(58) Field of Classification Search
CPC ..................................................... G08B 21/00
USPC ............................ 250/234, 216, 330, 339.15
See application file for complete search history.

(56) References Cited

U.S. PATENT DOCUMENTS

| | | | |
|---|---|---|---|
| 2007/0125951 A1* | 6/2007 | Snider | G06K 9/00771 250/363.03 |
| 2011/0025521 A1* | 2/2011 | Gurton | F41H 11/00 340/686.1 |
| 2011/0142283 A1* | 6/2011 | Huang | G06T 7/2006 382/103 |
| 2012/0242864 A1* | 9/2012 | Pauli | F41G 3/147 348/236 |

FOREIGN PATENT DOCUMENTS

CH   EP 2469294 A1 *  6/2012 ............. G01S 7/483

* cited by examiner

*Primary Examiner* — Renee Chavez
(74) *Attorney, Agent, or Firm* — Reches Patents

(57) ABSTRACT

A device that may include a narrowband filter that is arranged to pass radiation within a main signal waveband in which a muzzle flash is expected to include energy above a first energy threshold; a first single photon avalanche diode (SPAD) arranged to detect photons of the main signal waveband during different points in time and to output first digital detection signals representative of the photons of the main signal waveband; and a signal processor that is arranged to receive the first digital detection signals and to detect, in response to at least the first digital detection signals, the muzzle flash.

22 Claims, 13 Drawing Sheets

MUZZLE FLASH DETECTION

RELATED APPLICATIONS

This application claims priority from Israeli patent application serial number 225839 filing date Apr. 18, 2013 which is incorporated herein by reference.

FIELD OF THE INVENTION

The present disclosure relates to Gun Muzzle Flash Detection using a CMOS single photon avalanche diode (SPAD).

BACKGROUND OF THE INVENTION

In recent years, CMOS image sensors have emerged as the dominating alternative to charge coupled device (CCD) cameras.

CMOS active pixel sensor (APS) cameras have become a commodity, because of the low cost, low power, the ability to integrate analog and digital functions and the overall progress in reducing the readout noise and improving the overall performance CMOS active pixel sensor (APS) cameras store the integrated signal at each pixel as an amount of charge, which is proportional to the photo-current and the stored charge is converted by in-pixel amplifier operating as source follower into voltage.

Modern low intensity conflicts and acts of terrorism are stressing the need for military and law enforcement agencies to locate sporadic sources of hostile fire. The impact of gun detection systems on the battlefield depends not only on performance parameters of the single system but also on the abundance of the system among fighting forces. Silicon based sensors, in particular CMOS Image sensors, have revolutionized low cost imaging systems but to date have not been used for gun muzzle flash detection, due to performance limitations, and low signal to noise ratio (SNR) in the visible spectrum.

Single Avalanche Photo-Diode (SPAD) pixels are devices that can provide an internal gain with high-bandwidth characteristics. SPADs include a p-n junctions engineered to withstand high current densities when operated above breakdown. This is also known as Geiger mode operation. Geiger mode pixels with suitable readout structures for quenching and counting are theoretically capable of single photon detection and hence are referred to as single-photon avalanche diodes (SPADs). In Geiger mode, the SPAD is biased above its breakdown voltage (BV), and a single photoelectron theoretically initiates a self-propagating avalanche caused by the iterative multiplication of both the electrons and holes at high internal-electric Field strengths. This phenomenon is known as an avalanche breakdown.

In-pixel quenching and counting circuitry detects the presence of this avalanche current, and subsequently drops the bias below the BV. After quenching, the bias can then be raised again, above breakdown, awaiting the arrival of another single photoelectron event, thereby resetting the Geiger SPAD pixel. When operated in the Geiger mode, the SPAD can theoretically achieve single photon sensitivity with sub nanosecond timing characteristics.

SUMMARY OF THE INVENTION

There may be provided a device that may include a narrowband filter that may be arranged to pass radiation within a main signal waveband in which a muzzle flash is expected to include energy above a first energy threshold; a first single photon avalanche diode (SPAD) arranged to detect photons of the main signal waveband during different points in time and to output first digital detection signals representative of the photons of the main signal waveband; and a signal processor that may be arranged to receive the first digital detection signals and to detect, in response to at least the first digital detection signals, the muzzle flash.

The signal processor may be arranged to detect the muzzle flash if differences between at least three first digital detection signals exceed a difference threshold.

The signal processor may be arranged to detect the muzzle flash if a correlation between at least three first digital detection signals exceed a correlation threshold.

The signal processor may be arranged to detect the muzzle flash if differences between at least three first digital detection signals are equal to each other and exceed a difference threshold.

The signal processor may be arranged to detect the muzzle flash if differences between at least three weighted sums of different partially overlapping groups of first digital detection signals exceed a difference threshold.

The timing difference between a pair of consecutive points of time does not exceed 0.1 millisecond.

The device further may include a guard bandpass filter and a guard sensor; wherein the guard bandpass filter passes radiation within a guard waveband for which the muzzle flash has energy below the first energy threshold and for which a light interference has an energy above a light interference threshold; wherein the guard sensor may be arranged to detect photons of the guard waveband during different points in time and to output second digital detection signals representative of the photons of the guard waveband.

The guard sensor may be a SPAD.

The signal processor may be arranged to detect the muzzle flash if differences between at least three first digital detection signals exceed a difference threshold and if the second digital detection signals are indicative of photons of the guard waveband of energy that is below the first energy threshold.

The signal processor may be arranged to detect the muzzle flash if differences between at least three first digital detection signals are equal to each other and exceed a difference threshold and if the second digital detection signals are indicative of photons of the guard waveband of energy that is below the first energy threshold.

The signal processor may be arranged to detect the muzzle flash if differences between at least three weighted sums of different partially overlapping groups of first digital detection signals exceed a difference threshold and if the second digital detection signals are indicative of photons of the guard waveband of energy that is below the first energy threshold.

The device may include an array of SPADs, each SPAD of the array may be arranged to detect photons of the main signal waveband during different points in time and to output first digital detection signals representative of the photons of the main signal waveband; wherein the signal processor may be arranged to receive the first digital detection signals from the SPADs of the array and to detect, in response to at least the first digital detection signals, the muzzle flash.

The digital processor may be arranged to separately process first digital detection signals from each SPAD of the array.

The digital processor may be arranged to detect a muzzle flash in response to process first digital detection signals from groups of SPADs of the array.

The array of SPADs is integrated with an array of complementary metal oxide semiconductor (CMOS) image sensors.

There may be provided a method that may include passing, by a narrowband filter, radiation within a main signal waveband in which a muzzle flash is expected to include energy above a first energy threshold; detecting by a first single photon avalanche diode (SPAD), photons of the main signal waveband during different points in time; outputting first digital detection signals representative of the photons of the main signal waveband; and detecting, by a signal processor, in response to at least the first digital detection signals, the muzzle flash.

The method may include calculating a correlation between at least three first digital detection signals and detecting the muzzle flash if the correlation between at least three first digital detection signals exceed a correlation threshold.

The method may include detecting the muzzle flash if differences between at least three weighted sums of different partially overlapping groups of first digital detection signals exceed a difference threshold.

The method may include: passing by a guard bandpass filter passes radiation within a guard waveband for which the muzzle flash has energy below the first energy threshold; detecting by a guard sensor photons of the guard waveband during different points in time; outputting second digital detection signals representative of the photons of the guard waveband; and wherein the detecting, by the signal processor, the muzzle flash is further responsive to the second digital detection signals.

The method may include: detecting by each SPAD of an array of SPADs photons of the main signal waveband during the different points in time; outputting, by each SPD of the array of SPADs, first digital detection signals representative of the photons of the main signal waveband; and detecting, by a signal processor, one or more flash muzzles in response to at least first digital detection signals outputted from one or more SPADs of the array of SPADs.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
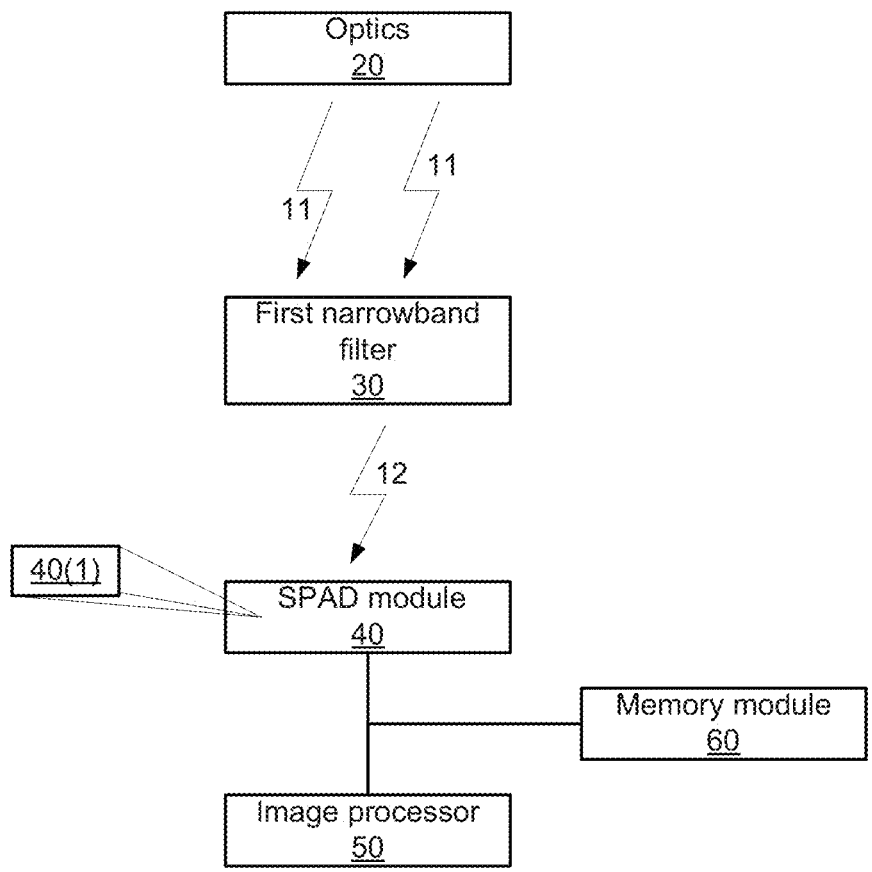
FIG. 1 illustrates a device according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

There is provided a device that includes a digital processor, optics and at least one Single Avalanche Photo-Diode (SPAD). It is noted that the device may include an array of SPADs instead of a single SPAD.

Each SPAD is being used in a Geiger mode in which the SPAD is capable of counting individual photons. Each SPAD converts the optical signal to a digital signal at the source pixel, thus practically eliminating readout noise. This enables high sampling frequencies in the Kilohertz range without SNR degradation, in contrast to regular CMOS image sensors. The detection of photons by an array of SPAD pixels represents a true all-digital fast single photon-counting technology because the pixels produce the digital pulses for each photon which is detected. This digital, photon-counting renders the readout noise associated with an analog reading circuitry, insignificant.

The device is capable of recording and sampling muzzle flash events in the visible spectrum, from representative weapons, common on the modern battlefield.

The device may be able to effectively detect muzzle flash in the presence of day light. This effectiveness may be facilitated by at least one out of the following: (i) using a first narrowband filter for reducing static sun light interference (increase the muzzle flash signal over solar radiation), and (ii) using guard waveband detection and/or a differential detection scheme for differentiating between a muzzle flash and dynamic sun light interferences such as solar glints.

Gun propellant manufacturers use alkali salts to suppress secondary flashes ignited during the muzzle flash event. Common alkali salts are compounds based on Potassium or Sodium, with spectral emission lines around 769 nm and 589 nm, respectively. The first narrowband filter passes radiation within a first waveband that is defined around the Potassium emission doublet. The first narrowband filter is followed by a SPAD sensor. The SPAD sensor is also termed main signal sensor.

The guard detection uses a guard bandpass filter that is followed by a guard sensor such as a guard SPAD sensor. The guard bandpass filter passes radiation within a guard waveband for which the muzzle flash has little or no energy while the dynamic sun light interferences have significant energy. The substantial or significant energy is an energy level above an energy threshold. The energy threshold may be predetermined or may be adjusted over time.

Comparing between the outcomes of the guard sensor and the main signal sensor indicates whether a detected phenomenon is a light interference such as a sun glint (if both sensors detect substantial energy) or is a muzzle flash (only the main signal sensor detects substantial energy).

Using only guard waveband detection without the differential detection scheme reduces the energy consumption of the device. Using both techniques increases the reliability of the muzzle flash detection.

The muzzle flash signal intensity if of very high variability but it has been found that the duration of the different stages of the muzzle flash are of less variability and this the relative changes over time in the intensity of the detection signals may be monitored in order to detect muzzle flash.

The SPAD array may be integrated with an image array such as an CMOS image sensor array.

FIG. 1 illustrate device 101 according to an embodiment of the invention.

Device 101 may include optics 20, first narrowband filter 30, SPAD module 40, guard narrowband filter 31 an image processor 50 and a memory module 60.

Optics 20 may include any known optical components such as lenses, beam splitters, polarizing elements, masks, collimators, apertures and the like.

First narrowband filter 30 is arranged to pass radiation within a main signal waveband in which a muzzle flash is expected to include energy above a first energy threshold.

Radiation (photons) 11 is directed towards first narrowband filter 30 from optics 20.

Radiation (photons) 12 within the main signal waveband pass through the first narrowband filter 30 and impinge on SPAD module 40.

Figure 2:
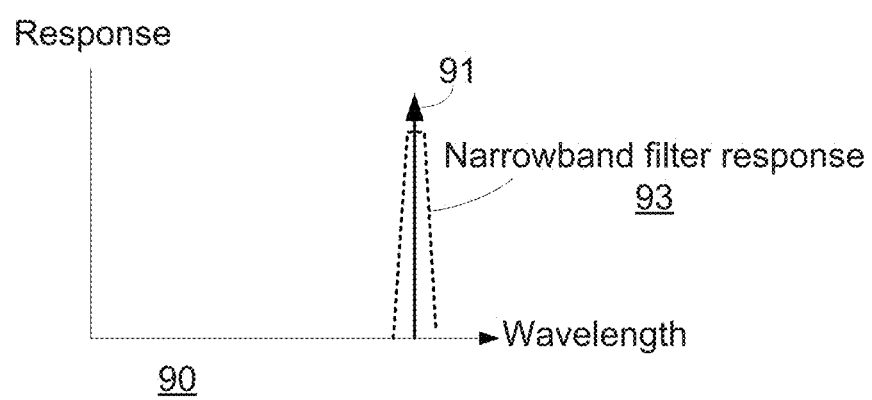
FIG. 2 illustrates a frequency response according to various embodiments of the invention.

FIG. 2 incldes graph 90 that illustrates the frequency response 93 of the first narrowband filter 30 according to an embodiment of the invention. The first narrowband filter 30 passes radiation (dashed lines 91) around a muzzle flash radiation peak 91. It blocks radiation outside the main signal band.

Figure 3:
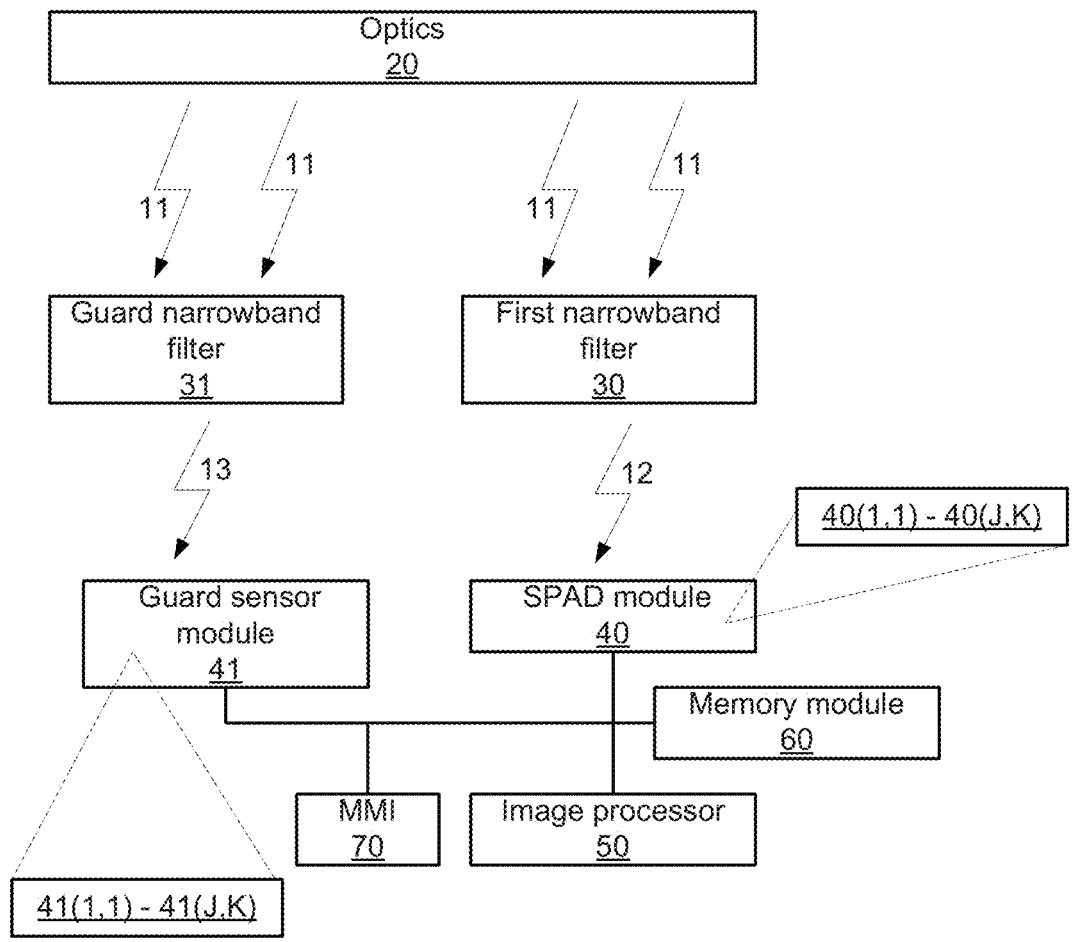
FIG. 3 illustrates a device according to an embodiment of the invention.

FIG. 3 illustrate device 103 according to an embodiment of the invention.

Device 103 may include optics 20, first narrowband filter 30, SPAD module 40, guard narrowband filter 31, guard sensor module 41, an image processor 50, memory module 60 and a man machine interface (MMI) module 70.

MMI module 70 may be a display, a loudspeaker or both. The MMI module 70 can be included in any of the devices illustrate din any of the figures. It may be replaced with a transmitter for sending alerts or other information to yet another device.

Guard narrowband filter 31 is arranged to pass radiation 13 within a guard waveband in which a muzzle flash is expected to not include energy above a first energy threshold but in which light interferences are expected to have energy above the first energy threshold. It is noted that different thresholds may be used to determine that the photons of the main signal waveband are of substantial energy and that the photons of the guard waveband are of insignificant energy. Any energy threshold is regarded as an example of a signal metric. Other signal metrics that may be used include, for example, signal to noise ratio.

Radiation (photons) 11 is directed towards first narrowband filter 30 from optics 20. Radiation (photons) 12 within the main signal waveband pass through the first narrowband filter 30 and impinge on SPAD module 40 that includes an array of SPADs 40(1,1)-40(J,K). Radiation (photons) 13 within the guard waveband pass through the guard narrowband filter 31 and impinge on the guard sensor module 41.

The guard sensor module 41 may include at least one guard sensor. A guard sensor may be a SPAD but this is not necessarily so. The multiple guard sensors may be arranged in an array. The array may be single dimensional or two dimensional array. The array may be a rectangular array of have other shapes. FIG. 3 (and FIGS. 5 and 8) illustrate the guard sensor module 41 as including an array of K columns and J rows of guard sensors 41(1,1)-41(K,J).

Each guard sensor of the guard sensor module 41 is arranged to detect photons of the guard waveband during different points in time and to output second digital detection signals representative of the photons of the guard waveband.

Each SPAD of SPAD module 40 is arranged to detect photons of the main signal waveband during different points in time and to output first digital detection signals representative of the photons of the main signal waveband.

The signal processor 50 is arranged to receive the first and second digital detection signals and to detect, in response to at least the first and second digital detection signals, the muzzle flash.

The signal processor 50 may be arranged to apply a differential detection scheme and/or guard waveband detection. It may execute, for example, stage 340 of method 200 of FIG. 12.

The memory module 60 may store the first digital detection signals and/or the second digital detection signals and/or an outcome of the detection process applied by the signal processor. The latter may include muzzle flush detection information.

Figure 13:
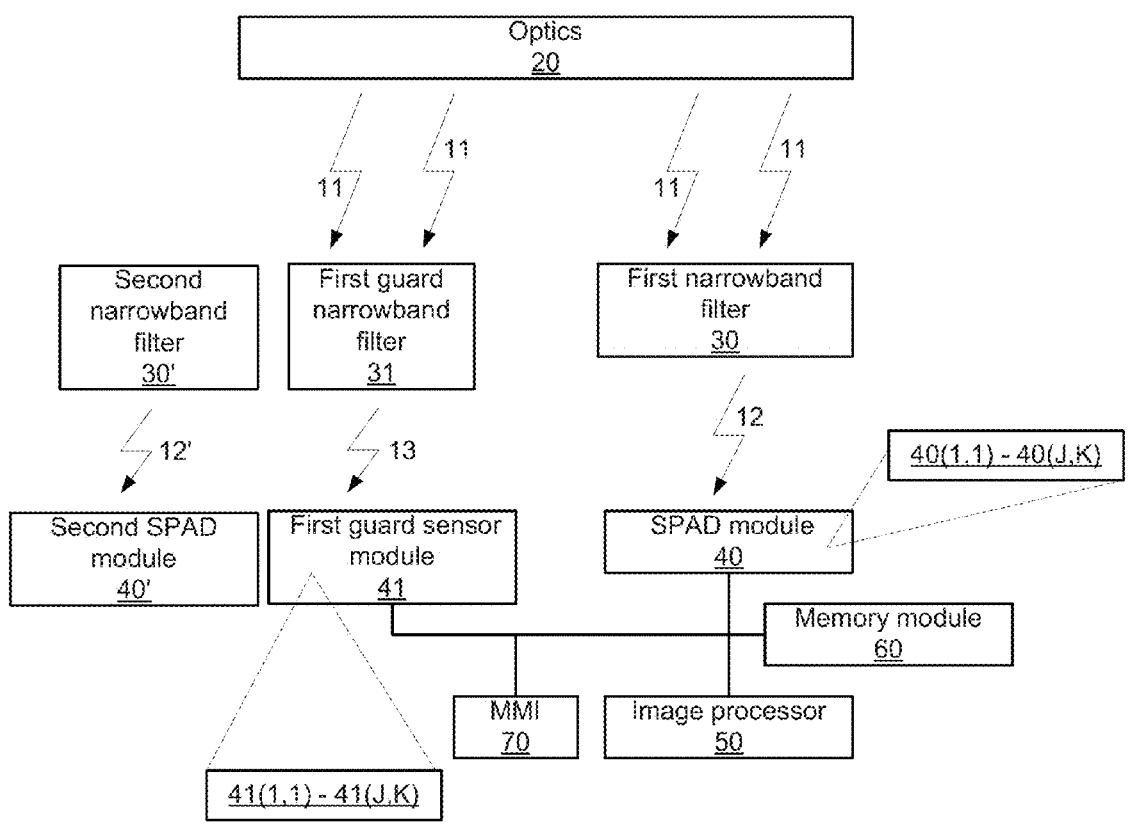
FIG. 13 illustrates a device according to an embodiment of the invention.

FIG. 13 illustrates device 113 according to an embodiment of the invention. Device 113 of FIG. 13 differs from device 103 of FIG. 3 by including two SPAD modules (40 and 40') and two narrowband filters (30 and 30') instead of a single SPAD module 40 and a single narrowband filter 30. Thus—the energy at yet another main channel may be passed and sensed. Different (at least two) narrowband filters and different SPAD modules may be allocated for sensing emission of different gases.

For example, one narrowband filter may pass radiation of wavelength of 589.6 nanometer or 589 nanometer that represents an emission of Sodium and another narrowband filter may pass radiation of wavelength of 769 nanometer or 766 nanometer that represents an emission of Potassium. Various decisions may be made—for example receiving substantial emission in one or more of these wavebands and insignificant emission at the guard narrowband may result in a detection of a muzzle flash.

Figure 4:
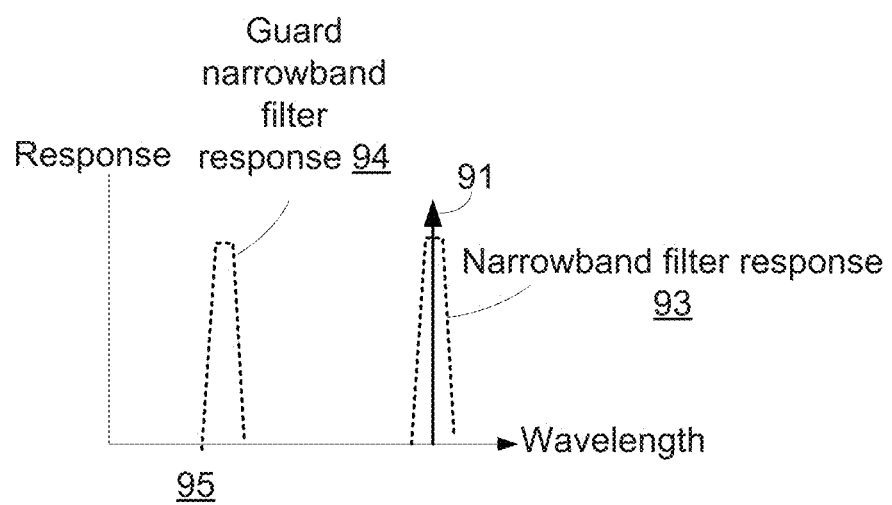
FIG. 4 illustrates frequency responses according to various embodiments of the invention.

FIG. 4 includes a graph 95 that illustrates the frequency response 93 of the first narrowband filter 30 and the frequency response 94 of the guard narrowband filter according to an embodiment of the invention. It illustrates that the first narrowband filter 30 passes radiation (dashed lines 91) around a muzzle flash radiation peak 91 and that the guard narrowband filter 31 passes radiation (dashed lines 94) within a guard waveband in which a muzzle flash is expected to not include energy above a first energy threshold but in which light interferences are expected to have energy above the first energy threshold.

According to an embodiment of the invention the device may include a CMOS image sensor module in addition to the SPAD module and/or the guard sensor module. The inclusion of the CMOS image sensor may provide visual information about the area from which the flash muzzle was generated. The CMOS image sensor module may include on or more CMOS image sensors. There may be a CMOS image sensor per SPAD but this is not necessarily so.

Figure 5:
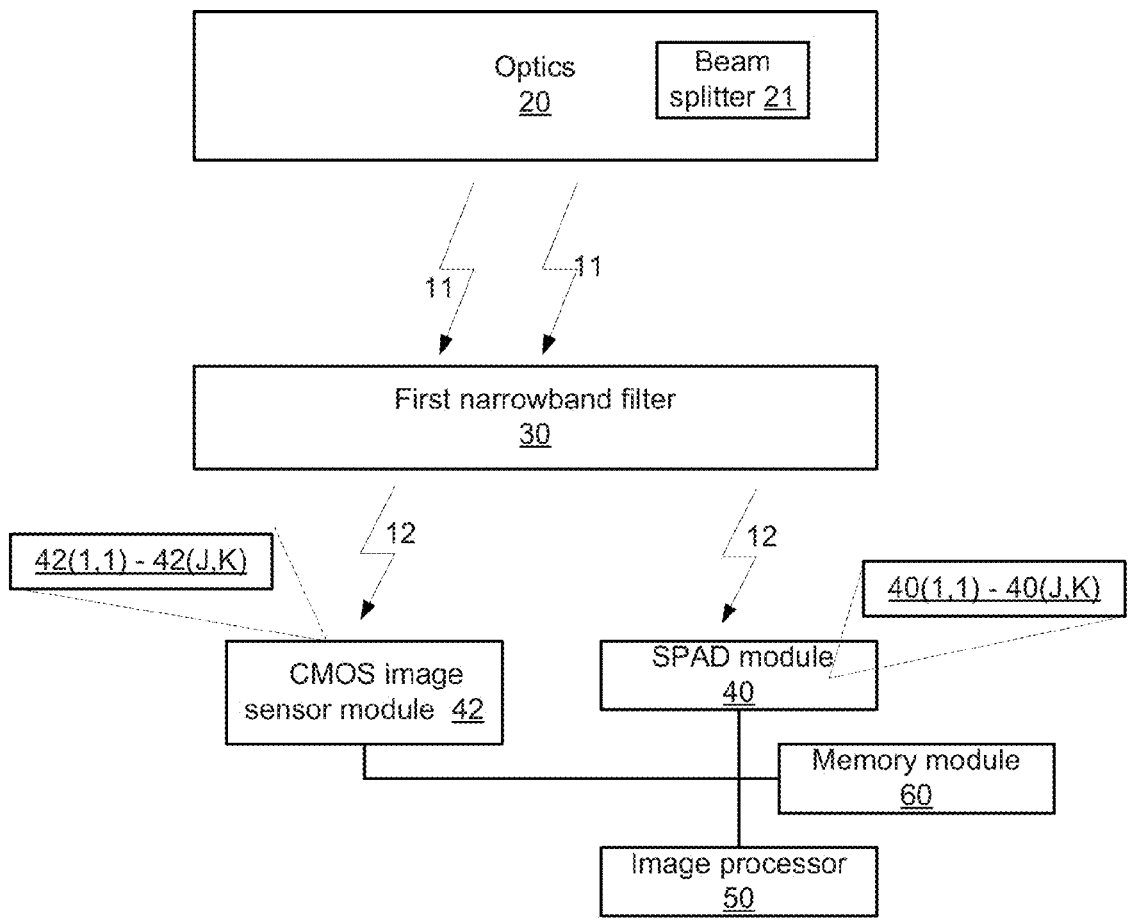
FIG. 5 illustrates a device according to an embodiment of the invention.
Figure 6:
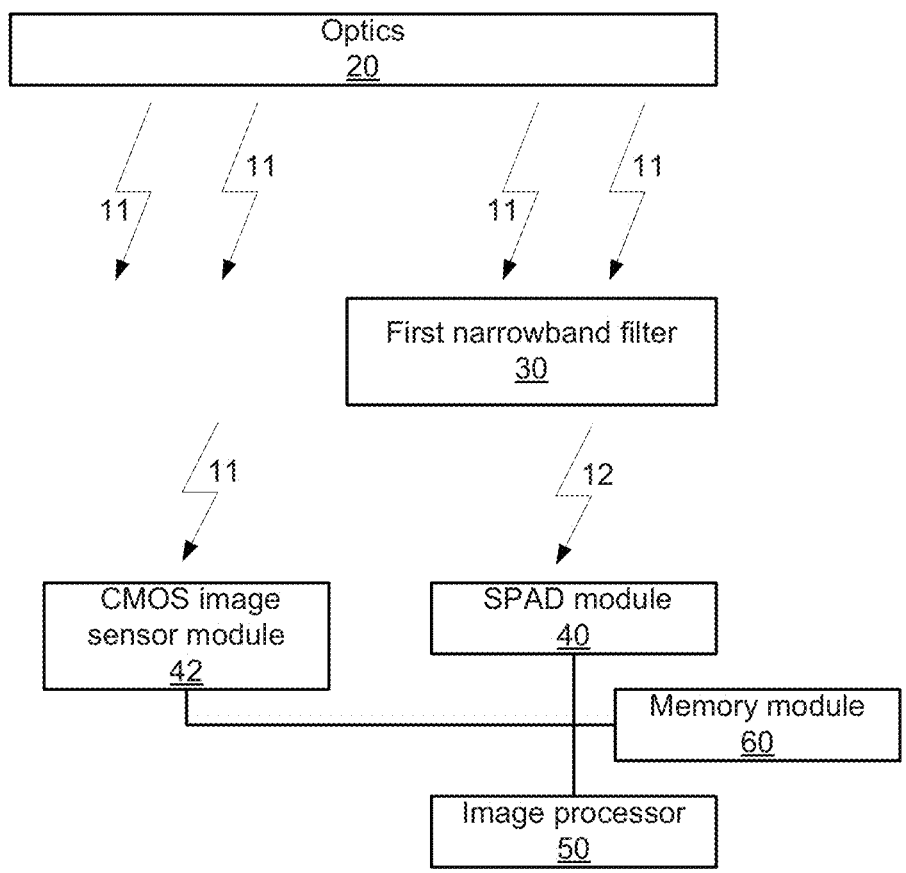
FIG. 6 illustrates a device according to an embodiment of the invention.

FIGS. 5 and 6 illustrate devices 105 and 106 according to various embodiments of the invention in which a CMOS image sensor module 42 is included in addition to SPAD module 40.

Devices 105 and 106 include optics 20, first narrowband filter 30, SPAD module 40, CMOS image sensor module 42, an image processor 50 and memory module 60.

In FIG. 5 the CMOS image sensor module 42 includes an array of CMOS image sensors 42(1,1)-42(J,K) and the CMOS image sensor module 42 receives radiation 12 that passes through the first narrowband filter 30.

FIG. 5 also shows optics 20 as including beam splitter 20 for splitting radiation so that radiation eventually reaches both CMOS image sensor module 42 and SPAD module 40.

In FIG. 6 the CMOS image sensor module 42 receives radiation 11 that did not pass through the first narrowband filter 30.

Figure 7:
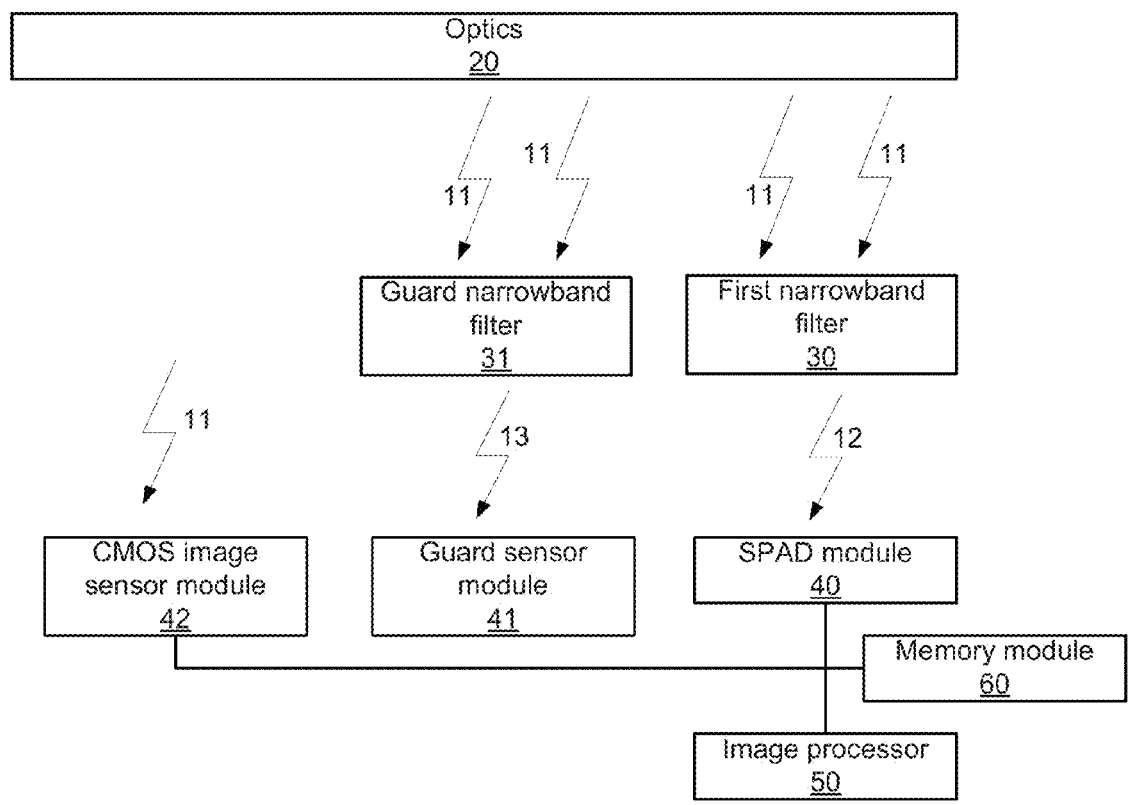
FIG. 7 illustrates a device according to an embodiment of the invention.

FIG. 7 illustrate device 107 according to an embodiment of the invention.

Device 107 includes optics 20, first narrowband filter 30, guard narrowband filter 31, SPAD module 40, guard sensor module 41, CMOS image sensor module 42, image processor 50, memory module 60.

Any combination of sensor modules (40, 41 and 42) and bandpass filters (31 and 30) may be provided. In FIG. 7 there is provided an example where the SPAD module 40 received radiation filtered by first narrowband filter 30, guard sensor module 41 receives radiation filtered by guard narrowband filter 31 and CMOS image sensor module 42 receives unfiltered radiation.

Figure 8:
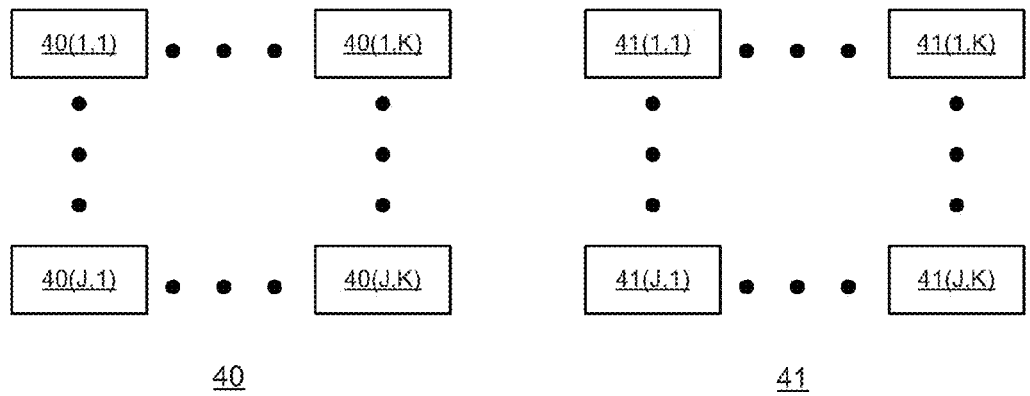
FIG. 8 illustrates sensor modules according to various embodiments of the invention.
Figure 8:
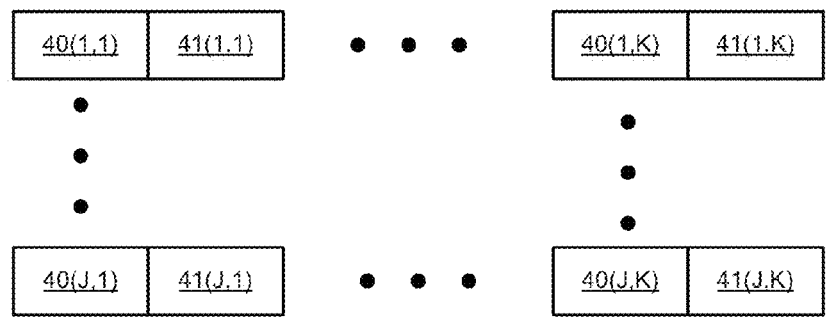

FIG. 8 illustrates sensor module 40, 41 and 44 according to various embodiments of the invention.

SPAD module 40 includes K columns and J rows of SPADs. CMOS image sensor module 42 includes K columns and J rows of SPADs. Module 44 is a combination of SPAD sensors and CMOS image sensors. The SPAD sensors and the CMOS image sensors may be arranged in different manners to provide a single array of sensors. Module 44 illustrates an array that include K*2 columns and J rows of sensor—wherein this array includes pairs of adjacent SPAD and COMS image sensors. Other arrangements may be provided. For example the different sensors may be arranged in a chess-like manner in which sensors of the same type form diagonals. Yet for another example—sensors of the same type may be arranged in groups (rows, columns, two dimensional structures) and the like. The number of CMOS image sensor may equal to or may differ from the number of SPADs.

Similar arrangements may be provided for the guard sensors—there may be arranged in separate arrays or integrated with SPAD sensors and/or CMOS image sensors.

Figure 9:
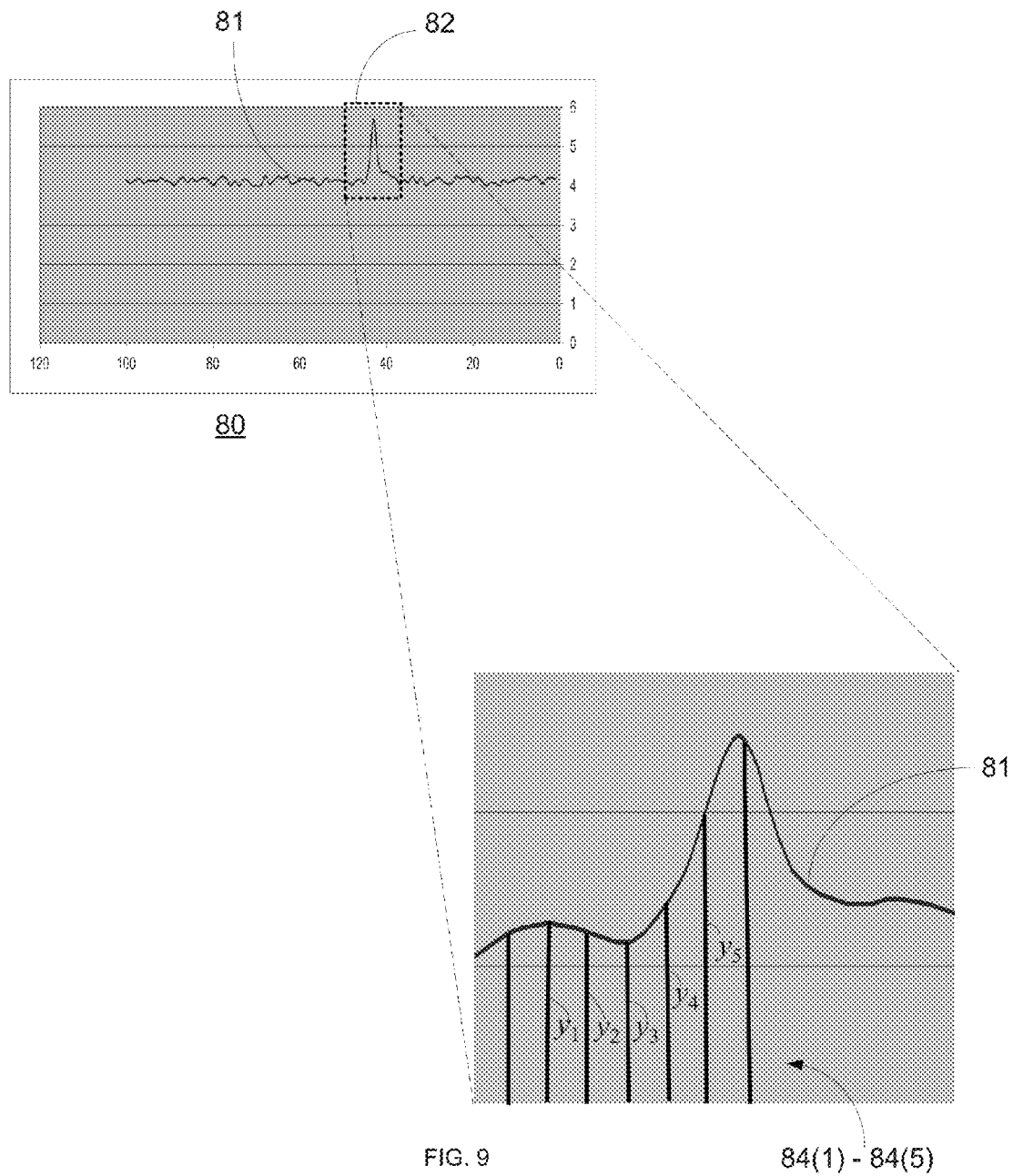
FIG. 9 illustrates a curve that represent radiation emitted as a result of a muzzle flash event, and multiple first digital detection signals taken at different points in time according to an embodiment of the invention.

FIG. 9 illustrates a curve 81 that represent the radiation emitted as a result of a muzzle flash event, and multiple first digital detection signals taken at different points in time according to an embodiment of the invention. The first digital detection signals are acquired during the duration of the muzzle flash 84(1)-84(5). A portion of curve 81 is enlarged (box 82) to provide a better view of the samples.

Figure 10:
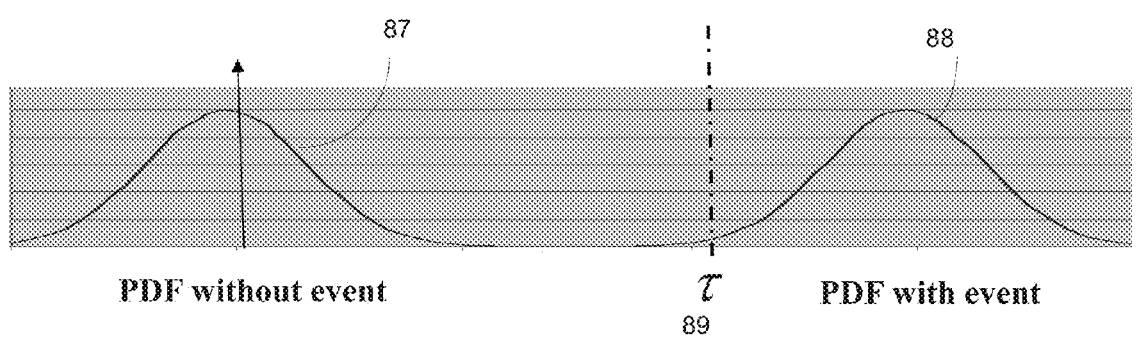
FIG. 10 illustrates a probability density function having two lobes according to an embodiment of the invention.

FIG. 10 illustrates a probability density function (PDF) 86 having two lobes 87 and 88 according to an embodiment of the invention.

The PDF 86 is indicative of the distribution of values differences between consecutive first digital detection signals at the presence of a muzzle flash (lobe 88) or at the absence of a muzzle flash (lobe 87).

Figure 11:
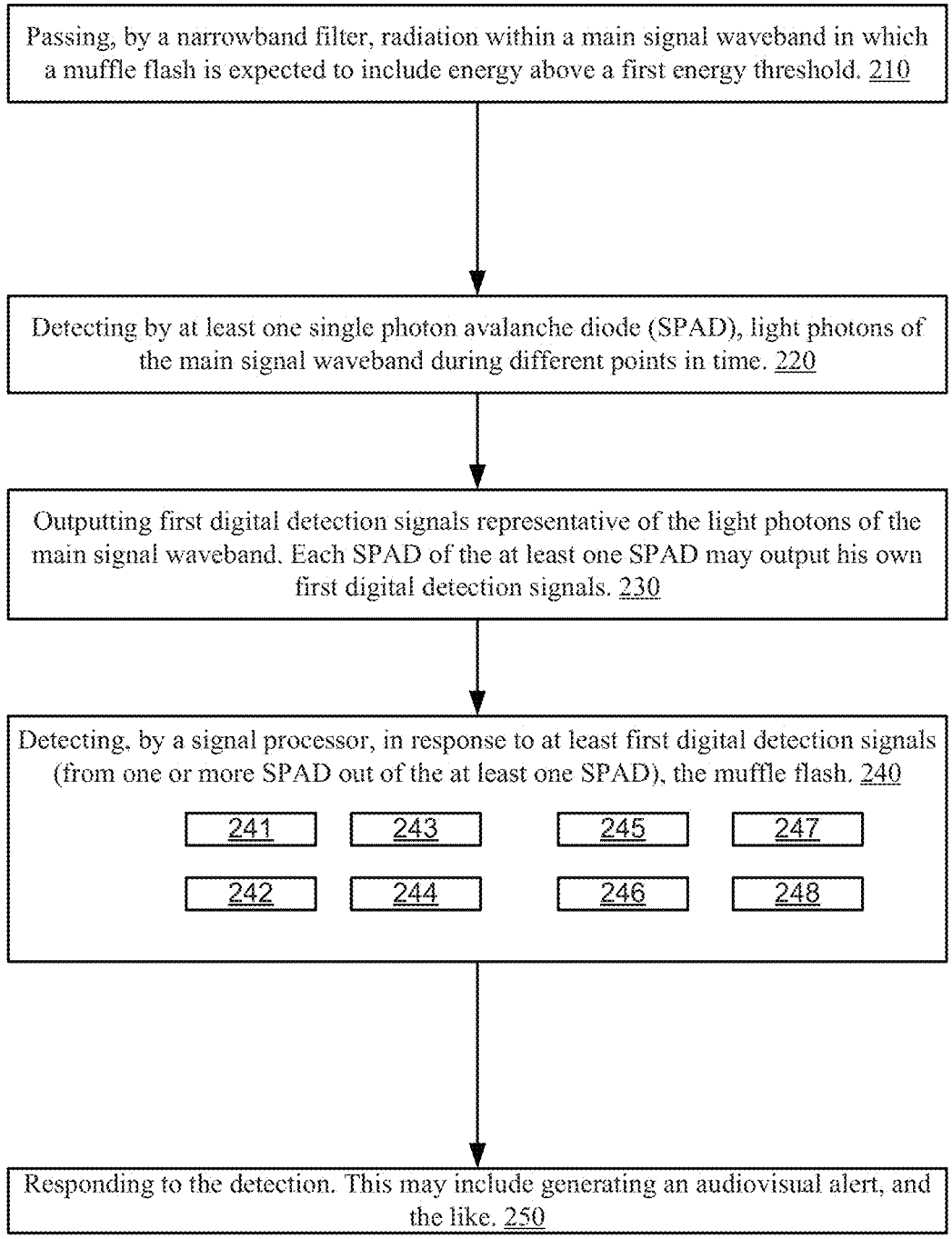
FIG. 11 illustrates a method according to an embodiment of the invention.

FIG. 11 illustrates method 200 according to an embodiment of the invention.

Method 200 may start by stage 210 of passing, by a narrowband filter, radiation within a main signal waveband in which a muzzle flash is expected to include energy above a first energy threshold. In this main signal waveband the muzzle flash is expected to exhibit substantial energy—and energy that is expected to have a substantial signal to noise ratio.

Stage 210 may be followed by stage 220 of detecting by at least one single photon avalanche diode (SPAD), photons of the main signal waveband during different points in time.

The at least one SPAD used during stage 220 for detecting photons of the main signal waveband may be a single SPAD or multiple SPADs. The multiple SPADs may be arranged in an array. The array may be a one or two dimensional array. The array may be rectangular array of have other shapes. The at least one SPAD may be included in a SPAD module.

Stage 220 may be followed by stage 230 of outputting first digital detection signals representative of the photons of the main signal waveband. Each SPAD of the at least one SPAD may output his own first digital detection signals.

Stage 230 may be followed by stage 240 of detecting, by a signal processor, in response to at least first digital detection signals (from one or more SPAD out of the at least one SPAD), the muzzle flash.

Stage 240 may include applying a differential detection scheme. This may include applying at least one of the following stages (241-248):

a. Calculating a correlation between at least three first digital detection signals. 241. The correlation may be calculated by comparing difference between first digital detection signals, by comparing differences between outputs of a filter (such as an in infinite impulse response filter) applied on the first digital detection signals.

b. Detecting the muzzle flash if the correlation between at least three first digital detection signals exceed a correlation threshold. 242.

c. Calculating differences between at least three first digital detection signals. 243.

d. Detecting the muzzle flash if the differences between at least three first digital detection signals exceed a difference threshold. 244.

e. Calculating differences between at least three weighted sums of different partially overlapping groups of first digital detection signals. 245.

f. Detecting the muzzle flash if differences between at least three weighted sums of different partially overlapping groups of first digital detection signals exceed a difference threshold. 246.

g. Detecting the muzzle flash if differences between at least three first digital detection signals are equal to each other and exceed a difference threshold. 247.

h. Detecting the muzzle flash if differences between at least three weighted sums of different partially overlapping groups of first digital detection signals exceed a difference threshold. 248.

Any of these calculations may involve processing consecutive first or second digital detection signals.

Assuming that Yi is a i'th first detection signal of a sequence of signals, Xi is an i'th then non-limiting example of weighted sums of different partially overlapping groups may be:

a. $X1=Y2-Y1; X2=Y3-Y2; X3=Y4-Y3.$ b. $X1=Y3-0.5*(Y2+Y1); X2=Y4-0.5*(Y3+Y2); X3=Y5-0.5*(Y4+Y2).$ c. $X1=Y4-0.33*(Y3+Y2+Y1); X2=Y5-0.33*(Y4+Y3+Y2); X3=Y6-0.33*(Y3+Y4+Y2).$

Stage 240 may be followed by stage 250 of responding to the detection. This may include generating an audiovisual alert, and the like.

Figure 12:
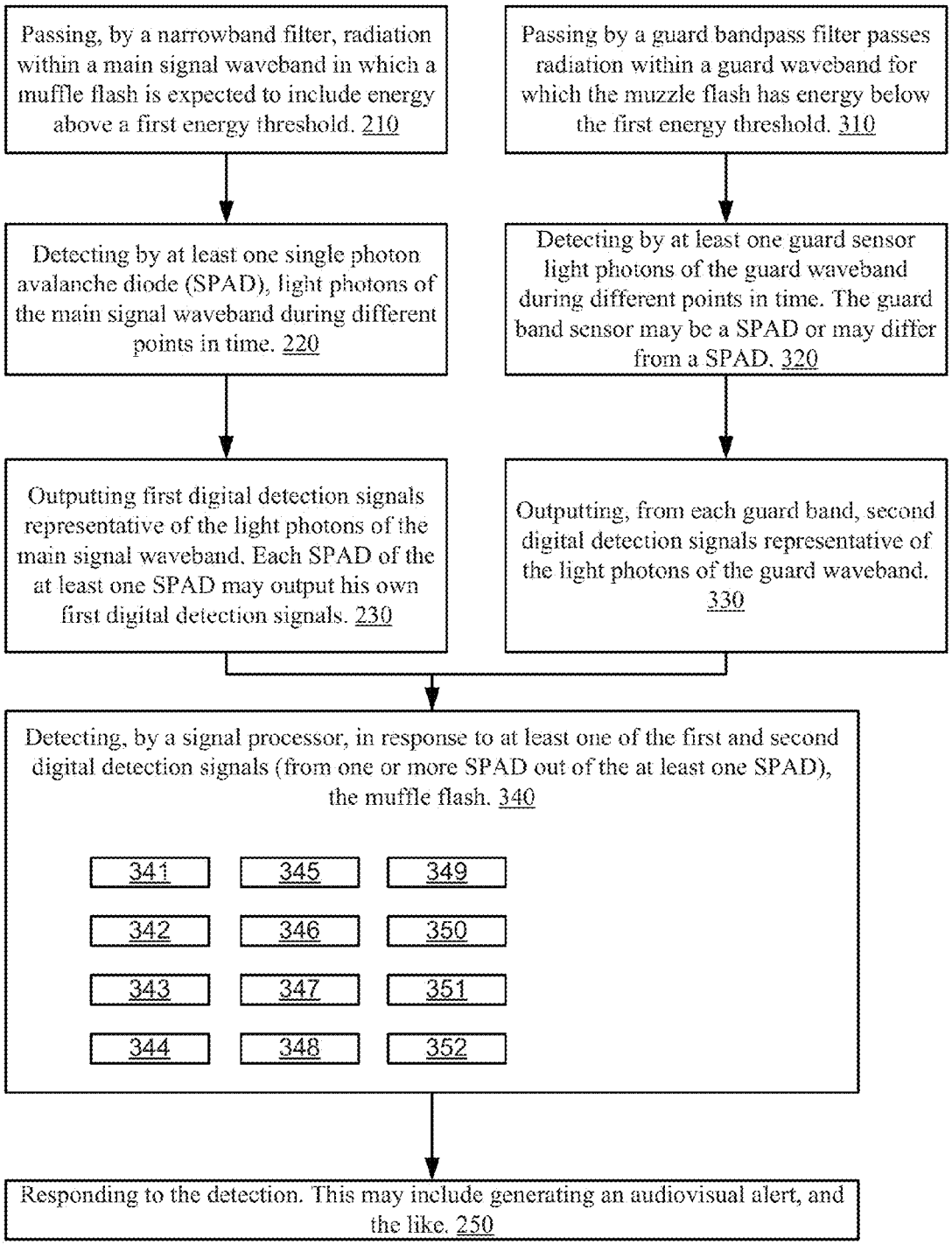
FIG. 12 illustrates a method according to an embodiment of the invention.

FIG. 12 illustrates method 300 according to an embodiment of the invention.

Method 200 may start by stages 210 and 310.

Stage 210 may include passing, by a narrowband filter, radiation within a main signal waveband in which a muzzle flash is expected to include energy above a first energy threshold. In this main signal waveband the muzzle flash is expected to exhibit substantial energy—and energy that is expected to have a substantial signal to noise ratio. Stage 210 includes rejecting radiation outside the main signal waveband.

Stage 210 may be followed by stage 220 of detecting by at least one single photon avalanche diode (SPAD), photons of the main signal waveband during different points in time.

Stage 220 may be followed by stage 230 of outputting first digital detection signals representative of the photons of the main signal waveband. Each SPAD of the at least one SPAD may output his own first digital detection signals.

Stage 310 may include passing by a guard bandpass filter passes radiation within a guard waveband for which the muzzle flash has energy below the first energy threshold. It is expected that in the guard waveband the muzzle flash has no or little energy while the light interference has energy above the first energy threshold—it has substantial energy. Stage 310 includes rejecting radiation outside the guard waveband.

Stage 310 may be followed by stage 320 of detecting by at least one guard sensor photons of the guard waveband during different points in time. The guard band sensor may be a SPAD or may differ from a SPAD.

The at least one guard sensor may be a single guard sensor or multiple guard sensors. The multiple guard sensors may be arranged in an array. The array may be a one or two dimensional array. The array may be rectangular array of have other shapes. The at least one guard sensor may be included in a guard sensor module. There may be a guard sensor for each SPAD of the SPAD module. Both the SPAD and its corresponding guard sensor may be arranged to receive photons from the same area within the field of view of the device.

Stage 320 may be followed by stage 330 of outputting, from each guard band, second digital detection signals representative of the photons of the guard waveband.

Stages 230 and 330 may be followed by stage 340 of detecting, by a signal processor, in response to at least one of the first and second digital detection signals (from one or more SPAD out of the at least one SPAD), the muzzle flash.

Thus, the detection of the muzzle flash may be responsive to the first and second digital detection signals or only to the first digital detection signals.

Stage 340 may include using guard waveband detection and/or a differential detection scheme for differentiating between a muzzle flash and dynamic sun light interferences such as solar glints.

Stage 340 may apply the guard waveband detection scheme during certain time periods and may apply the differential detection scheme at other time periods.

Stage 340 may apply both the guard waveband detection scheme and the differential detection scheme at one or more time period and apply only one of the guard waveband detection and the differential detection scheme at one or more other time periods.

Stage 340 may include at least one of the following (341-352):

a. Calculating a correlation between at least three first digital detection signals. 341.

b. Detecting the muzzle flash if the correlation between at least three first digital detection signals exceed a correlation threshold.

c. Calculating differences between at least three first digital detection signals. 342.

d. Detecting the muzzle flash if the differences between at least three first digital detection signals exceed a difference threshold. 343.

e. Calculating differences between at least three weighted sums of different partially overlapping groups of first digital detection signals. 344.

f. Detecting the muzzle flash if differences between at least three weighted sums of different partially overlapping groups of first digital detection signals exceed a difference threshold. 345.

g. Detecting the muzzle flash if differences between at least three first digital detection signals are equal to each other and exceed a difference threshold. 346.

h. Detecting the muzzle flash if differences between at least three weighted sums of different partially overlapping groups of first digital detection signals exceed a difference threshold. 347.

i. Detecting a muzzle flash if the first digital detection signals are indicative of photons of a substantial energy and the second detection signals are indicative of photons of non-substantial energy. 348.

j. Detecting a muzzle flash if differences between at least three first digital detection signals exceed a difference threshold and if the second digital detection signals are indicative of photons of the guard waveband of energy that is below the first energy threshold. 349.

k. Detecting a muzzle flash if differences between at least three first digital detection signals are equal to each other and exceed a difference threshold and if the second digital detection signals are indicative of photons of the guard waveband of energy that is below the first energy threshold. 350.

l. Detecting a muzzle flash if differences between at least three weighted sums of different partially overlapping groups of first digital detection signals exceed a difference threshold and if the second digital detection signals are indicative of photons of the guard waveband of energy that is below the first energy threshold. 351.

Stage 340 may be followed by stage 250 of responding to the detection. This may include generating an audiovisual alert, and the like.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A device, comprising:
a narrowband filter that is arranged to pass radiation within a main signal waveband that is defined around 769 nanometer or is defined around 589 nanometer, wherein in the main signal waveband a muzzle flash is expected to include energy above a first energy threshold; wherein the narrowband filter is configured to suppress static sun light interferences;
a first single photon avalanche diode (SPAD) arranged to detect photons of the main signal waveband during different points in time and to output first digital detection signals representative of the photons of the main signal waveband; and
a signal processor that is arranged to receive the first digital detection signals and to detect, in response to at least the first digital detection signals, the muzzle flash.

2. The device according to claim 1 wherein the signal processor is arranged to detect the muzzle flash if differences between at least three first digital detection signals exceed a difference threshold.

3. The device according to claim 1 wherein the signal processor is arranged to detect the muzzle flash if a correlation between at least three first digital detection signals exceed a correlation threshold.

4. The device according to claim 1 wherein the signal processor is arranged to detect the muzzle flash if differences between at least three first digital detection signals are equal to each other and exceed a difference threshold.

5. The device according to claim 1 wherein the signal processor is arranged to detect the muzzle flash if differences between at least three weighted sums of different partially overlapping groups of first digital detection signals exceed a difference threshold.

6. The device according to claim 1 wherein a timing difference between a pair of consecutive points of time of the different points in time does not exceed 0.1 millisecond.

7. The device according to claim 1 further comprising a guard bandpass filter and a guard sensor;
wherein the guard bandpass filter passes radiation within a guard waveband for which the muzzle flash has energy below the first energy threshold and for which a light interference has an energy above a light interference threshold;
wherein the guard sensor is arranged to detect photons of the guard waveband during different points in time and to output second digital detection signals representative of the photons of the guard waveband; and
wherein the image processor is arranged to receive the second digital detection signals and to detect, in response to at least the first and second digital detection signals, the muzzle flash.

8. The device according to claim 7 wherein the guard sensor is a SPAD.

9. The device according to claim 7 wherein the signal processor is arranged to detect the muzzle flash if differences between at least three first digital detection signals exceed a difference threshold and if the second digital detection signals are indicative of photons of the guard waveband of energy that is below the first energy threshold.

10. The device according to claim 7 wherein the signal processor is arranged to detect the muzzle flash if differences between at least three first digital detection signals are equal to each other and exceed a difference threshold and if the second digital detection signals are indicative of photons of the guard waveband of energy that is below the first energy threshold.

11. The device according to claim 7 wherein the signal processor is arranged to detect the muzzle flash if differences between at least three weighted sums of different partially overlapping groups of first digital detection signals exceed a difference threshold and if the second digital detection signals are indicative of photons of the guard waveband of energy that is below the first energy threshold.

12. The device according to claim 1 comprising an array of SPADs, each SPAD of the array is arranged to detect photons of the main signal waveband during different points in time and to output first digital detection signals representative of the photons of the main signal waveband; wherein the signal processor is arranged to receive the first digital detection signals from the SPADs of the array and to detect, in response to at least the first digital detection signals, the muzzle flash.

13. The device according to claim 12 wherein the digital processor is arranged to separately process first digital detection signals from each SPAD of the array.

14. The device according to claim 12 wherein the digital processor is arranged to detect a muzzle flash in response to first digital detection signals from groups of SPADs of the array.

15. The device according to claim 12 wherein the array of SPADs is integrated with an array of complementary metal oxide semiconductor (CMOS) image sensors.

16. A method, comprising:
  passing, by a narrowband filter, radiation within a main signal waveband that is defined around 769 nanometer or is defined around 589 nanometer, wherein in the main signal waveband a muzzle flash is expected to include energy above a first energy threshold; wherein the narrowband filter is configured to suppress static sun light interferences;
  detecting by a first single photon avalanche diode (SPAD), photons of the main signal waveband during different points in time;
  outputting first digital detection signals representative of the photons of the main signal waveband; and
  detecting, by a signal processor, in response to at least the first digital detection signals, the muzzle flash.

17. The method according to claim 16 comprising calculating a correlation between at least three first digital detection signals and detecting the muzzle flash if the correlation between at least three first digital detection signals exceed a correlation threshold.

18. The method according to claim 16 comprising detecting the muzzle flash if differences between at least three weighted sums of different partially overlapping groups of first digital detection signals exceed a difference threshold.

19. The method according to claim 16 comprising:
  passing by a guard bandpass filter passes radiation within a guard waveband for which the muzzle flash has energy below the first energy threshold;
  detecting by a guard sensor photons of the guard waveband during different points in time;
  outputting second digital detection signals representative of the photons of the guard waveband; and
  wherein the detecting, by the signal processor, the muzzle flash is further responsive to the second digital detection signals.

20. The method according to claim 16 comprising:
  detecting by each SPAD of an array of SPADs photons of the main signal waveband during the different points in time;
  outputting, by each SPD of the array of SPADs, first digital detection signals representative of the photons of the main signal waveband; and
  detecting, by a signal processor, one or more flash muzzles in response to at least first digital detection signals outputted from one or more SPADs of the array of SPADs.

21. The device according to claim 1 wherein the main signal waveband is defined around 769 nanometer; and wherein the device comprises an additional narrowband filter that is arranged to pass radiation within an additional main signal waveband that is defined around 589 nanometer.

22. The method according to claim 16 wherein the main signal waveband is defined around 769 nanometer; and wherein the method comprises passing by an additional narrowband filter radiation within an additional main signal waveband that is defined around 589 nanometer.

* * * * *